Feb. 1, 1955 V. E. GLEASMAN 2,700,984
ROTARY CONTROL VALVE
Filed Jan. 7, 1954
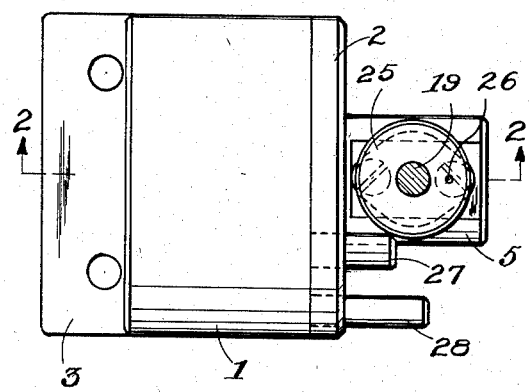
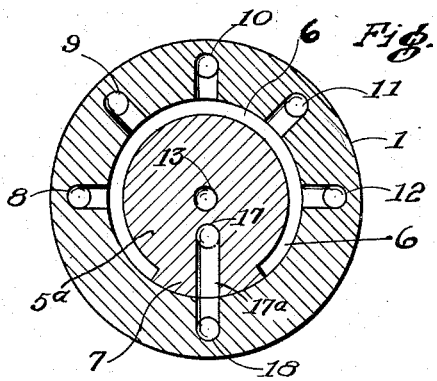
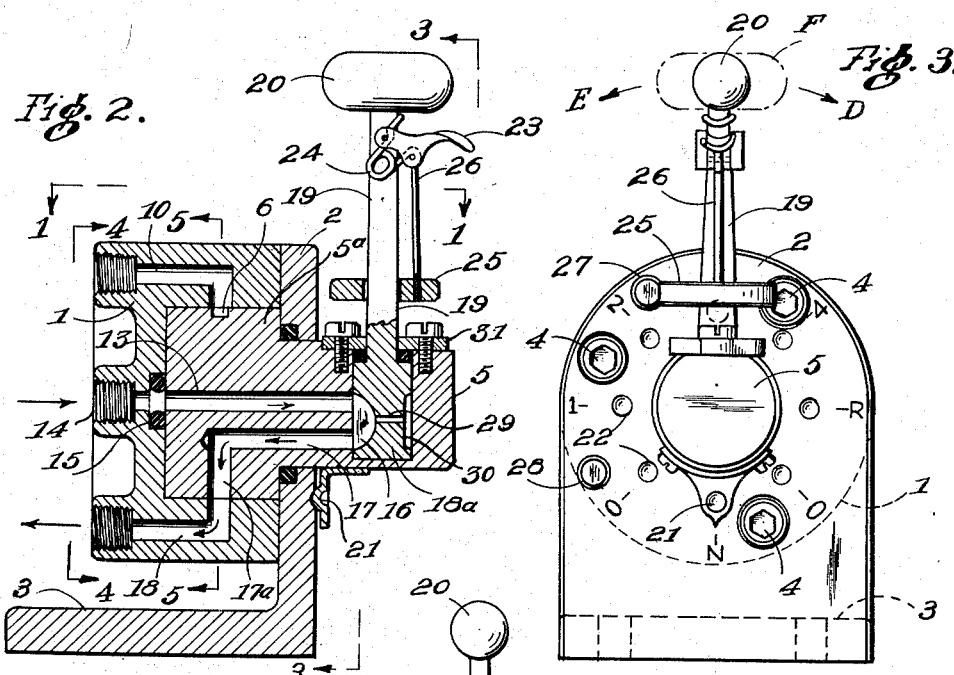
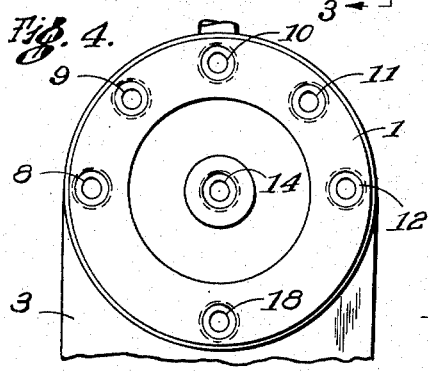
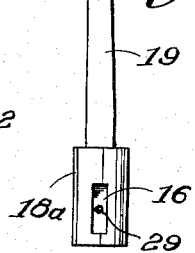
INVENTOR.
VERNON E. GLEASMAN
BY
ATTORNEYS United States Patent Office 2,700,984
Patented Feb. 1, 1955

2,700,984

ROTARY CONTROL VALVE

Vernon E. Gleasman, Cleveland, Ohio

Application January 7, 1954, Serial No. 402,755

20 Claims. (Cl. 137—622.5)

This invention is a novel control valve, and is an improvement over the valve shown in my U. S. Letters Patent No. 2,177,213 issued October 24, 1939.

My present invention provides an improved valve designed for efficiency, simplicity in design in manufacture, and at the same time retains the same general principles as set forth in my prior Patent No. 2,177,213, the same having substantially the same hand-bar arrangement; and my valve disclosed herein having the function of the two sections of the valve shown in my aforesaid patent combined into one, thereby greatly simplifying the design while retaining the same general functions. In addition to the features of compactness and simplification, my new design presents other advantages, such as providing for the index position numbers associated with a spring-pressed detent to hold the valve at the proper point of index.

Another object is to provide a control valve which may have other uses for controlling air or fluid where it is desirous to skip, or to select, various ports at random in either direction of indexing, the function of my novel valve being to control, in their proper sequence, a number of fluid actuated clutches utilized in transmissions with counter-shafts, as set forth in my Patent No. 2,177,213, and Patent No. 2,226,309 issued December 24, 1940; or in transmissions involving planetary gearing embodying multiple disc clutches and utilizing pistons for the engagement of bands such as the hydra-matic transmissions presently manufactured by certain automobile manufacturing companies.

Although it is understood that air is a compressible fluid, the term "fluid" will be hereinafter referred to and is intended to include air. The word "transmission" primarily relates to automotive and truck drives, but is not necessarily limited thereto. It may also include any other application where a transmission may be utilized, such as in tractor, machine tool, or the like.

Transmissions such as the hydra-matic have attained a wide commercial acceptance for pleasure car use with automatic shift control. However, due to the wide range of working conditions that a truck is subjected to, automatic controls are not entirely satisfactory.

Considerable thought has been given to the design of a simple foolproof hand control valve, but it has proven difficult to control a series of clutches so designed that they can be utilized in their proper sequence and return the control handle back to neutral without the reengagement of the various clutches that were engaged on the way up. For instance, in descending a hill it is sometimes desirous to reengage the respective clutches for the purpose of gearing-down to restrain the load. Also, on some occasions it is desirable to skip a clutch either on the way up, or on the way back, with the selector lever.

The principal object of the present invention is to provide a control valve which satisfies the above requirements, in its entirety.

A further object of the invention is to provide a valve which will be foolproof in that only one clutch can be engaged at a time, thus avoiding stripping the gears in the transmission.

A still further object of the invention is to provide a valve which will be flexible in design, in that by adding additional port holes it can satisfy any number of ratios.

Still further objects and advantages will be apparent from the following description taken in connection with the accompanying drawing, in which:

Fig. 1 represents a top view of the valve, taken on line 1—1, Fig. 2.

Fig. 2 is a vertical cross-section through the valve, taken on the line 2—2, Fig. 1.

Fig. 3 is a right-hand end view of the parts shown in Fig. 2.

Fig. 4 is a left-hand end view of the parts shown in Fig. 2.

Fig. 5 is a transverse section taken on line 5—5, Fig. 2.

Fig. 6 is a detail plan view of the hand lever shown in Fig. 2, detached.

In the drawings, numeral 1 indicates a housing, one end of which is open, but is normally closed by a cover plate 2 forming an integral part of a mounting bracket 3, cover plate 2 and housing 1 being held in assembled position by bolts 4 (Fig. 3), the same forming an index chamber accommodating a rotatable index selector element 5 which is dimensioned to form a snug fit within the space provided by housing 1 and cover plate 2.

The enlarged inner portion 5a of rotatable element 5 is provided with a circumferential arcuate groove 6 (Figs. 2 and 5) which nearly encircles said portion of the element, the function of the remaining ungrooved portion 7 being hereinafter explained. The circumferential groove 6 is, as shown in Fig. 5, in neutral position and in communication with ports 8, 9, 10, 11 and 12 of housing 1 which are hereinafter referred to as index ports.

The rotatable element 5 also has a centrally located duct 13 (Figs. 2 and 5) for the introduction of fluid from inlet port 14 (Figs. 2 and 4) of housing 1. Between the housing 1 and the rotatable element 5a, provision is made to accommodate an O ring seal 15 (Fig. 2) or the like, to avoid build-up of pressure between the end of the rotatable element 5a and housing 1, thereby eliminating a tendency of the rotatable element 5 to bind by the reaction of fluid pressure built-up in duct 13.

From an inspection of Fig. 2, it can be seen that the inlet duct 13 continues to a rotatable valve 18a having a semi-circular slot 16 (Fig. 2), said slot 16 being in neutral position in Fig. 2, whereby fluid is allowed to flow from duct 13 into passage 17 in element 5 and into index duct 17a, and out through outlet duct 18 in housing 1 which is the fluid return line. Therefore, with the slot 16 in neutral position, and in Figs. 2 and 5, the associated pump (not shown) being by-passed, there can be no pressure build-up in the control valve system with respect to ports 8, 9, 10, 11 and 12.

Mounted on an exterior projection of rotatable element 5 (Fig. 2) is the axially rotatably mounted valve 18a provided with the semi-circular slot 16 (Figs. 2 and 6) aforementioned. This valve element 18a has a reduced handle extension 19 (Figs. 2 and 6) terminating in a T-knob 20, or the like, extension 19 being utilized as a control handle, and will be hereinafter referred to as such.

From an inspection of Figs. 3 and 5 it can be seen that by swinging the control lever 19 to the right or left (Fig. 3 in the direction of arrows D or E) to where the spring-pressed detent and pointer 21 engages one of the recesses 22 (Fig. 3) indicated by the letter O, these are also neutral positions, but in this case the pump connected with inlet port 14 in the system is by-passing through its own conventional means (not shown). In these positions the conduit 13 is pressurized, but it can be seen from an inspection of Fig. 5 that the ungrooved portion 7, previously referred to, has correspondingly indexed in relation to the control handle 19, and, therefore, index ports 8, 9, 10 and 11 are now directly in communication with the return line 18 through the annular channel 6. With this arrangement there can be no build-up of pressure due to leakage that normally would tend to engage a clutch or clutches.

By again advancing the control lever 19 in the clockwise direction D (Fig. 3) until the detent pointer 21 registers with index station denoted by the numeral "1" (Fig. 3) it can be seen from an inspection of Fig. 5 that port 8 will now be in communication with the pressurized ducts 17 and 17a, thereby engaging the corresponding clutch but the remaining ports 9, 10, 11, 12, will be neutralized through channel 6 and outlet port 18.

By again advancing the control lever 19 in the clockwise direction D (Fig. 3) until the detent pointer 21 registers with the position denoted by the numeral "2" (Fig. 3), fluid under pressure from duct 17 and 17a will be directed into port 9 (Fig. 5); and in this position the portion 7 has uncovered the port 8 that was formerly pressurized and through the channel 6 it is bled-off through the return line 18. The control lever 19 can thus be advanced in this manner clear through the station denoted by the numeral "4" of the index range (Fig. 3).

If desirous, the clutches can be picked up in sequence by rotating the control lever 19 backwardly in the anticlockwise direction or in the direction of the arrow E (Fig. 3).

If it is not desirous to pick up the clutches on the way back, or in the direction of arrow E (Fig. 3), the second valve 18a (Figs. 2 and 6) may be axially rotated until the knob 20 is in the position F (Fig. 3) of the valve assembly, thereby blocking the fluid in the pressurized passage 13 from entering passage 17. In this position the selector element 5 (Fig. 2) can be rotated back in an anti-clockwise direction to neutral position (direction E) without effecting any of the respective clutches as the ports 11, 10, 9 and 8 are exposed on the way back. It is this feature that enables the skipping of any clutch forward or backward at the discretion of the operator to neutralize the valve at any point of index.

"Reversing" position is provided with a safeguard arrangement, associated with the control lever 19, the "reversing" position being indicated by the reference letter R (Fig. 3). This arrangement involves a latch 23 (Fig. 2) held in a downward position by spring 24. This latch is connected to collar 25 by a rod 26. In neutral position a post 27 (Figs. 1 and 3) is positioned so as to act as a stop to prevent further indexing of the selector in direction E (Fig. 3). By lifting latch 23, the collar 25 may be raised to clear post 27 and thereby allow the control lever 19 to be indexed in the counter-clockwise direction into "reversing" position R. A similar stop 28 is provided to prevent the control lever 19 from being indexed from position 4 directly into reversing position R in the clockwise direction D (Fig. 3). Stop 28 is long enough to act as a constant stop with respect to the handle 19 of the control valve.

Associated with valve slot 16 is a small duct 29 connected to a relief area 30 approximately equal to that of valve slot 16 for the purpose of hydraulic balance. The valve element 18a is held in place by a conventional packing gland 31.

Summarising, my novel control valve provides a rotary control valve element housed in a single chamber, the exterior of the valve element containing a second valve element; also provides in such arrangement a valve having index numbers, pointer and spring-pressed detent; also provides in such arrangement a valve having an index station lockout associated therewith; also provides such arrangement having a valve provided with a channel nearly encircling the index element, said channel being fixed in relation with an index duct, and a second valve element controlling the flow through the index duct and the indexing thereof.

I do not limit my invention to the exact form shown in the drawing, for obviously changes may be made therein within the scope of the claims.

I claim:

1. A control valve comprising a housing having a bore, a closed end, and an open end; a cover plate having a circular hole closing said open end; a rotatable index selector snugly fitted within the bore, and having a reduced portion extending through the hole, and having a circumferential groove nearly encircling the selector within the bore thereby leaving an ungrooved portion between the ends of the groove; said selector having an axial bore therethrough communicating at its inner end with an axial inlet port in the closed end of the housing, and having an index duct one end of which terminates adjacent the outer end of the selector bore and the other end of which terminates through the ungrooved portion of the selector and adapted in neutral position of the selector to communicate with an outlet port in the closed end of the housing; said housing having an arcuate series of spaced ports therein opposite from the said outlet port and adapted in neutral position of the selector to all communicate with the circumferential groove; an axially rotatable valve member journaled in the reduced portion of the selector having a fluid slot in its side embracing in one position the outer ends of the bore and index duct of the selector; a handle for rotating said valve and for swinging the selector; and a second position of said selector wherein the ungrooved portion of the selector is disposed between the outlet port and the first of said arcuate series of ports and wherein one end of said circumferential groove registers with the outlet port preventing build-up of pressure in said groove.

2. In a valve as set forth in claim 1, a ring-seal disposed between the housing and inner end of the selector thereby avoiding build-up of pressure therebetween and eliminating binding of the parts when the bore of the selector is pressurized.

3. In a valve as set forth in claim 1, said extension having an indexing flexible pointer cooperating with indicia on the cover indicating positions into which the selector is swung by the handle, said cover having indicia depressions receiving a detent on the pointer.

4. In a valve as set forth in claim 1, said cover being integral with an L-shaped supporting bracket.

5. In a valve as set forth in claim 1, a bleeder slot extending from the slot in the valve into a recess forming a relief area at the side of the valve opposite from the slot; said area being substantially equal to that of the slot for the purpose of hydraulic balance.

6. In a valve as set forth in claim 1, a fixed post on the cover serving as a stop to limit the indexing swinging movement of the handle in returning to neutral position; a second fixed post on the cover preventing the handle from being swung beyond the position to pressurize the last of the series of circumferential ports.

7. A control valve comprising a housing having a bore, a closed end, and an open end; a cover plate having a circular hole closing said open end; a rotatable index selector snugly fitted within the bore, and having a reduced portion extending through the hole, and having a circumferential groove nearly encircling the selector within the bore thereby leaving an ungrooved portion between the ends of the groove; said selector having an axial bore therethrough communicating at its inner end with an axial inlet port in the closed end of the housing, and having an index duct one end of which terminates adjacent the outer end of the selector bore and the other end of which terminates through the ungrooved portion of the selector and adapted in neutral position of the selector to communicate with an outlet port in the closed end of the housing; said housing having an arcuate series of spaced ports therein opposite from the said outlet port and adapted in neutral position of the selector to all communicate with the circumferential groove; an axially rotatable valve member journaled in the reduced portion of the selector having a fluid slot in its side embracing in one position the outer ends of the bore and index duct of the selector; a handle for rotating said valve and for swinging the selector; and a second position of said selector wherein the ungrooved portion of the selector is disposed between the outlet port and the first of said arcuate series of ports and wherein one end of said circumferential groove registers with the outlet port preventing build-up of pressure in said groove; a third position of said selector wherein the index duct in the selector communicates with the first of the series of arcuate ports pressurizing said port; other positions of said selector wherein the index duct in the selector communicates in sequence with the others of the series of arcuate ports, thereby individually pressurizing said other ports, the previously pressurized ports being bled-off through the registering circumferential channel and the outlet port.

8. In a valve as set forth in claim 7, a ring-seal disposed between the housing and inner end of the selector thereby avoiding build-up of pressure therebetween and eliminating binding of the parts when the bore of the selector is pressurized.

9. In a valve as set forth in claim 7, said extension having an indexing flexible pointer cooperating with indicia on the cover indicating the positions into which the selector is swung by the handle, said cover having indicia depressions receiving a detent on the pointer.

10. In a valve as set forth in claim 7, said cover being integral with an L-shaped supporting bracket.

11. In a valve as set forth in claim 7, a bleeder slot extending from the slot in the valve into a recess forming a relief area at the side of the valve opposite from the slot; said area being substantially equal to that of the slot for the purpose of hydraulic balance.

12. In a valve as set forth in claim 7, a fixed post on the cover serving as a stop to limit the indexing swinging movement of the handle in returning to neutral position; a second fixed post on the cover preventing the handle from being swung beyond the position to pressurize the last of the series of circumferential ports.

13. A control valve comprising a housing having a bore, a closed end, and an open end; a cover plate having a circular hole closing said open end; a rotatable index selector snugly fitted within the bore, and having a reduced portion extending through the hole, and having a circumferential groove nearly encircling the selector within the bore thereby leaving an ungrooved portion between the ends of the groove; said selector having an axial bore therethrough communicating at its inner end with an axial inlet port in the closed end of the housing, and having an index duct one end of which terminates adjacent the outer end of the selector bore and the other end of which terminates through the ungrooved portion of the selector and adapted in neutral position of the selector to communicate with an outlet port in the closed end of the housing; said housing having an arcuate series of spaced ports therein opposite from the said outlet port and adapted in neutral position of the selector to all communicate with the circumferenial groove; an axially rotatable valve member journaled in the reduced portion of the selector having a fluid slot in its side embracing in one position the outer ends of the bore and index duct of the selector; a handle for rotating said valve and for swinging the selector; and a second position of said selector wherein the ungrooved portion of the selector is disposed between the outlet port and the first of said arcuate series of ports and wherein one end of said circumferential groove registers with the outlet port preventing build-up of pressure in said groove; a third position of said selector wherein the index duct in the selector communicates with the first of the series of arcuate ports pressurizing said port; other positions of said selector wherein the index duct in the selector communicates in sequence with the others of the series of arcuate ports, thereby individually pressurizing said other ports, the previously pressurized ports being bled-off through the registering circumferential channel and the outlet port; the ports of the arcuate series being pressurized in reverse sequence by rotation of the selector in the opposite direction back to neutral position; said valve when rotated to bring the slot out of register with the bore and index bore of the selector permitting the selector to be rotated back to neutral position without pressurizing any of the arcuate series of ports, said series being thereby neutralized.

14. In a valve as set forth in claim 13, a bleeder slot extending from the slot in the valve into a recess forming a relief area at the side of the valve opposite from the slot; said area being substantially equal to that of the slot for the purpose of hydraulic balance.

15. In a valve as set forth in claim 13, a fixed post on the cover serving as a stopper to limit the indexing swinging movement of the handle in returning to neutral position; a second fixed post on the cover preventing the handle from being swung beyond the position to pressurize the last of the series of circumferential ports.

16. A control valve comprising a housing having a bore, a closed end, and an open end; a cover plate having a circular hole closing said open end; a rotatable index selector snugly fitted within the bore, and having a reduced portion extending through the hole, and having a circumferential groove nearly encircling the selector within the bore thereby leaving an ungrooved portion between the ends of the groove; said selector having an axial bore therethrough communicating at its inner end with an axial inlet port in the closed end of the housing, and having an index duct one end of which terminates adjacent the outer end of the selector bore and the other end of which terminates through the ungrooved portion of the selector and adapted in neutral position of the selector to communicate with an outlet port in the closed end of the housing; said housing having an arcuate series of spaced ports therein opposite from the said outlet port and adapted in neutral position of the selector to all communicate with the circumferential groove; an axially rotatable valve member journaled in the reduced portion of the selector having a fluid slot in its side embracing in one position the outer ends of the bore and index duct of the selector; a handle for rotating said valve and for swinging the selector; and a second position of said selector wherein the ungrooved portion of the selector is disposed between the outlet port and the first of said arcuate series of ports and wherein one end of said circumferential groove registers with the outlet port preventing build-up of pressure in said groove; a third position of said selector wherein the index duct in the selector communicates with the first of the series of arcuate ports pressurizing said port; other positions of said selector wherein the index duct in the selector communicates in sequence with the others of the series of arcuate ports, thereby individually pressurizing said other ports, the previously pressurized ports being bled-off through the registering circumferential channel and the outlet port; the ports of the arcuate series being pressurized in reverse sequence by rotation of the selector in the opposite direction back to neutral position; said valve when rotated to bring the slot out of register with the bore and index bore of the selector permitting the selector to be rotated back to neutral position without pressurizing any of the arcuate series of ports, said series being thereby neutralized; a "reversing" port beyond the series; and means permitting the reversing port to be pressured.

17. In a valve as set forth in claim 16, said cover being integral with an L-shaped supporting bracket.

18. In a valve as set forth in claim 16, a bleeder slot extending from the slot in the valve into a recess forming a relief area at the side of the valve opposite from the slot; said area being substantially equal to that of the slot for the purpose of hydraulic balance.

19. In a valve as set forth in claim 16, a fixed post on the cover serving as a stopper to limit the indexing swinging movement of the handle in returning to neutral position; the last of the arcuate ports being the "reversing" port of the valve; a second fixed post on the cover normally preventing the handle from being swung beyond the position to pressurize the said "reversing" port; and means on the handle when actuated to permit the handle to be swung in a direction contrary to its normal swinging movement into "reversing" position to pressurize the "reversing" port.

20. In a valve as set forth in claim 19, said "reversing" port being disposed between the neutral port and the next to last of the arcuate ports; said means comprising a collar on said handle normally adapted to engage the first stop; and a spring-pressed rod on the handle connected with said collar; whereby when the rod is manually operated the collar will be shifted out of the path of the first stop.

No references cited.